United States Patent
Kitamura et al.

(10) Patent No.: US 10,881,124 B2
(45) Date of Patent: Jan. 5, 2021

(54) METHOD FOR PRODUCING ALKYL CELLULOSE

(71) Applicants: Shin-Etsu Chemical Co., Ltd., Tokyo (JP); SE Tylose GmbH & Co. KG, Wiesbaden (DE)

(72) Inventors: Akira Kitamura, Joetsu (JP); Atsushi Yamamoto, Joetsu (JP); Mitsuo Narita, Joetsu (JP); Heiko Nebel, Wiesbaden (DE); Andreas Schultz, Hanau (DE)

(73) Assignees: Shin-Etsu Chemical Co., Ltd., Tokyo (JP); SE Tylose GmbH & Co. KG, Wiesbaden (DE)

( * ) Notice: Subject to any disclaimer, the term of this patent is extended or adjusted under 35 U.S.C. 154(b) by 0 days.

(21) Appl. No.: 14/965,149

(22) Filed: Dec. 10, 2015

(65) Prior Publication Data

US 2016/0168271 A1   Jun. 16, 2016

(30) Foreign Application Priority Data

Dec. 11, 2014 (JP) .................. 2014-250996
Nov. 24, 2015 (JP) .................. 2015-228907

(51) Int. Cl.
| | |
|---|---|
| *C08B 11/02* | (2006.01) |
| *A23L 27/00* | (2016.01) |
| *C08L 1/28* | (2006.01) |
| *A23D 7/00* | (2006.01) |
| *C08B 1/08* | (2006.01) |

(52) U.S. Cl.
CPC ............. *A23L 27/80* (2016.08); *A23D 7/003* (2013.01); *C08B 1/08* (2013.01); *C08B 11/02* (2013.01); *C08L 1/28* (2013.01); *A23V 2002/00* (2013.01)

(58) Field of Classification Search
CPC ...................................... C08B 11/02
USPC ............................................ 536/99
See application file for complete search history.

(56) References Cited

U.S. PATENT DOCUMENTS

| | | | |
|---|---|---|---|
| 4,410,693 A | 10/1983 | Gibson et al. | |
| 4,547,570 A * | 10/1985 | Garner ................. | C08B 11/02 536/100 |
| 6,958,393 B2 * | 10/2005 | Schlesiger ............. | C08B 11/00 536/56 |
| 2004/0127700 A1 | 7/2004 | Schlesiger et al. | |
| 2005/0003071 A1 | 1/2005 | Cavallini et al. | |
| 2008/0242739 A1 | 10/2008 | Kroon et al. | |
| 2014/0178556 A1 | 6/2014 | Yun et al. | |
| 2015/0273062 A1 | 10/2015 | Moddelmog et al. | |
| 2017/0339995 A1 * | 11/2017 | Yamamoto ............. | A23L 27/80 |

FOREIGN PATENT DOCUMENTS

| | | |
|---|---|---|
| EP | 1493337 | 1/2005 |
| EP | 1803738 | 7/2007 |
| JP | 2005021163 | 1/2005 |
| JP | 2008-061621 | 3/2008 |
| JP | 2008061621 | 3/2008 |
| JP | 2009-183194 | 8/2009 |
| JP | 2009183194 | 8/2009 |
| WO | 200047628 | 8/2000 |
| WO | WO 00/59947 A1 | 10/2000 |
| WO | WO 2007/078015 A1 | 7/2007 |
| WO | WO 2012/051034 A1 | 4/2012 |
| WO | 2012122279 | 9/2012 |
| WO | 2012173838 | 12/2012 |
| WO | WO 2013/059064 A1 | 4/2013 |
| WO | 2014039966 | 3/2014 |
| WO | 2014062379 | 4/2014 |

OTHER PUBLICATIONS

International Search Report corresponding to Japanese Application No. PCT/JP2015/084610 dated Feb. 16, 2016.
European Search Report corresponding to European Application No. 15199333.4 dated Apr. 25, 2016.
English Translation of Office Action corresponding to Chinese Patent Application No. 201510909729.5 (5 pages) (dated Jan. 9, 2019).
Extended European Search Report corresponding to European Patent Application No. 15866629.7 (8 pages) (dated Apr. 13, 2018).
Office Action corresponding to related U.S. Appl. No. 15/534,417 (7 pages) (dated May 16, 2019).

* cited by examiner

*Primary Examiner* — Shaojia A Jiang
*Assistant Examiner* — Everett White
(74) *Attorney, Agent, or Firm* — Myers Bigel, P.A.

(57) ABSTRACT

Provided is a method for producing an alkyl cellulose having a high viscosity and not having an excessively high gel strength. More specifically, there is provided a method for producing an alkyl cellulose comprising the steps of: mixing a cellulose pulp with a first alkali metal hydroxide solution with stirring to obtain alkali cellulose; reacting the alkali cellulose with an alkylating agent to obtain a first reaction mixture; blending a second alkali metal hydroxide solution with the first reaction mixture with stirring, without further blending of the alkylating agent, to obtain a second reaction mixture; and purifying the second reaction mixture to obtain an alkyl cellulose. There is also provided an alkyl cellulose being produced by the above method and having a degree of substitution of alkyl group of 27 to 33% by weight.

13 Claims, No Drawings

METHOD FOR PRODUCING ALKYL CELLULOSE

RELATED APPLICATION

This application claims priority from Japanese Patent Application No. 2014-250996, filed Dec. 11, 2014 and Japanese Application No. 2015-228907, filed Nov. 24, 2015, the disclosures of which are incorporated by reference herein in their entirety.

FIELD AND BACKGROUND OF THE INVENTION

The present invention relates to a method for producing an alkyl cellulose having a high viscosity and not having an excessively high gel strength.

Cellulose ethers having thermoreversible gelation properties, such as methyl cellulose and hydroxypropyl methylcellulose, are used in processed foods in order to impart functions such as viscosity-increasing properties, freezing and thawing stability, lubricating properties, moisture-holding and moisture-releasing properties, texture improvement, water retention properties, emulsifying properties, binding properties, and shape-holding properties.

When burger patties or sausages are produced as foods for vegetarians and as edible meat analogs from raw materials mainly derived from plants, methyl cellulose having high gel strength is used to improve the texture thereof.

A method for producing methyl cellulose having a high gel strength includes the method comprising the first additions of an alkali metal hydroxide solution and a methylating agent for methylation to the extent of a predetermined degree of substitution, and then the second additions of an alkali metal hydroxide solution and a methylating agent to obtain a methyl cellulose having a desired degree of substitution (JP 2002-541270T which is the Japanese phase publication of WO 00/59947).

There is another method comprising the steps of: placing all of a cellulose pulp, sodium hydroxide and methyl chloride in a reactor, and then heating the resulting mixture with stirring for etherification to obtain methyl cellulose (JP 59-056401A).

There is still another method in which an alkali celluloseforming step from a cellulose pulp and an alkali metal hydroxide solution and an etherification step are divided into a plurality of steps. In the first step, an alkali metal hydroxide solution and a methylating agent are added for methylation to the extent of a predetermined degree of substitution. In the second step, a methylating agent is added at first, and subsequently an alkali metal hydroxide solution is added for etherification to obtain methyl cellulose (WO 2013/059064). In this case, by adding the alkali metal hydroxide solution in the second step at a higher ratio than that in the first step, the resulting methyl cellulose has a gelation temperature of about 37° C., which is the same as the temperature in the body, and which is lower than the gelation temperature of the methyl cellulose in JP 2002-541270T.

SUMMARY OF THE INVENTION

The meat analogs containing methyl cellulose as described in JP 2002-541270T have excessively high gel strength so that they have hard texture.

The methyl cellulose produced by the method described in JP 59-056401A has a higher thermal gelation temperature and a lower gel strength than those of the methyl cellulose described in JP 2002-541270T. Accordingly, the meat analogs containing the methyl cellulose produced by the method described JP 59-056401A are difficult to obtain good texture after cooked with heat.

The methyl cellulose produced by the method described in WO 2013/059064 has a lower dissolution temperature in water when it has an excessively low gelation temperature, so that such methyl cellulose is insufficiently dissolved, thereby failing to express viscosity.

There is thus a demand for a method for producing an alkyl cellulose having a high viscosity and not having an excessively high gel strength.

As a result of intensive studies for achieving the object, the inventors of the present invention have found that by adding an alkali metal hydroxide in a plurality of separate steps and adding an alkylating agent in one step for the reaction, an alkyl cellulose having a high viscosity and not having an excessively high gel strength can be obtained, and have completed the present invention.

In an aspect of the present invention, there is provided a method for producing an alkyl cellulose comprising the steps of: mixing a cellulose pulp with a first alkali metal hydroxide solution with stirring to obtain alkali cellulose; reacting the alkali cellulose with an alkylating agent to obtain a first reaction mixture; blending a second alkali metal hydroxide solution with the first reaction mixture with stirring, without further blending of the alkylating agent, to obtain a second reaction mixture; and purifying the second reaction mixture to obtain an alkyl cellulose, wherein a ratio of a weight of a first alkali metal hydroxide in the first alkali metal hydroxide solution to a total weight of the first alkali metal hydroxide and a second alkali metal hydroxide in the second alkali metal hydroxide solution is 50 to 86%. In another aspect of the present invention, there is provided an alkyl cellulose being produced by the above method and having a degree of substitution (DS) of alkyl group of 1.61 to 2.03.

According to the present invention, an alkyl cellulose having a high viscosity, for example, having a viscosity at 20° C. of a 1% by weight aqueous solution of the alkyl cellulose as measured by a Brookfield viscometer of 1,500 to 11,000 mPa·s, and not having an excessively high gel strength, for example, having a storage elastic modulus G' (65° C.) at 65° C. of a 1.5% by weight aqueous solution of the alkyl cellulose of 2,000 to 4,500 Pa.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

A cellulose pulp includes wood pulp and linter pulp, and is a raw material for conventional cellulose ethers. The intrinsic viscosity as an index of degree of polymerization of the cellulose pulp can be appropriately selected depending on the aqueous solution viscosity of an intended cellulose ether. The intrinsic viscosity at 25° C. is preferably 1,000 to 2,200 ml/g, more preferably 1,300 to 2000 ml/g. The intrinsic viscosity of the cellulose pulp can be determined by the method in accordance with method A in JIS P8215.

The cellulose pulp contains cellulose and water. In the present specification, the amount of "cellulose in a cellulose pulp" can be determined by the method in accordance with method A in JIS P8215.

The cellulose pulp is preferably a cellulose pulp powder through pulverization by a pulverizer. The pulp pulverizer can be any apparatuses capable of making a cellulose pulp into powder. The pulverizer includes a knife mill, a cutting mill, a hammer mill, a ball mill and a vertical roller mill. The cellulose pulp powder preferably has a weight average particle diameter $D_{50}$ of 30 to 400 µm. The weight average particle diameter $D_{50}$ of the cellulose pulp powder is determined by the method in which a plurality of test sieves having various mesh sizes in accordance with JIS Z8801 are attached to a low-tap sieve shaker; a pulp powder is placed on the top sieve; the pulp powder is sieved by vibration or tapping; then the weights on each sieve and under the sieves are measured to calculate the weight distribution; and the weight average particle diameter $D_{50}$ is determined as an average particle diameter at an integrated value of 50%.

The step of mixing a cellulose pulp and a first alkali metal hydroxide solution with stirring to obtain alkali cellulose will be described.

The alkali metal hydroxide solution is divided into, for example, a first alkali metal hydroxide solution and a second alkali metal hydroxide solution, and blended in two steps. The alkali metal hydroxide solution is not particularly limited. The alkali metal hydroxide solution includes a sodium hydroxide solution and a potassium hydroxide solution, and is preferably an aqueous sodium hydroxide solution from the viewpoint of cost efficiency. The first alkali metal hydroxide in the first alkali metal hydroxide solution is preferably the same kind as that of the second alkali metal hydroxide in the second alkali metal hydroxide solution, and, for example, sodium hydroxide is used as both of the first and the second alkali metal hydroxides. However, the alkali metal hydroxides can be a combination of different kinds of hydroxides, and, for example, sodium hydroxide can be used as the former hydroxide, and potassium hydroxide can be used as the latter hydroxide.

The blending of the alkali metal hydroxide solution is preferably adding the alkali metal hydroxide solution to the cellulose pulp, and examples thereof include directly dropping the alkali metal hydroxide solution and spraying the alkali metal hydroxide solution. Spraying the alkali metal hydroxide solution is preferred from the viewpoint of uniformity of the resulting alkali cellulose.

The concentration of the alkali metal hydroxide in the alkali metal hydroxide solution is preferably 10 to 60% by weight, more preferably 30 to 50% by weight from the viewpoint of etherification efficiency and handleability. The concentrations of the first alkali metal hydroxide and the second alkali metal hydroxide are preferably the same, but may be different.

The step of mixing a cellulose pulp and an alkali metal hydroxide solution with stirring is preferably carried out in a reactor with an inner stirring structure. The reactor is preferably equipped with a measurement device capable of measuring the inner temperature.

Before mixing the first alkali metal hydroxide solution and the cellulose pulp with stirring, it is preferred that the oxygen in the reactor be removed by a vacuum pump or the like and be replaced with an inert gas, preferably with nitrogen, in order to suppress the depolymerization caused in the presence of the alkali metal hydroxide and oxygen.

The amount of the first alkali metal hydroxide solution is preferably 2.0 to 4.0, more preferably 2.7 to 3.5 in terms of molar ratio (first alkali metal hydroxide/cellulose) of the first alkali metal hydroxide to the cellulose in the cellulose pulp. When the molar ratio of the first alkali metal hydroxide to the cellulose is less than 2.0, the gelation temperature may be excessively reduced so that viscosity may not be expressed, and the alkyl cellulose having a high gel strength may not be produced. When the molar ratio is more than 4.0, the alkyl cellulose having a high gel strength may not be produced.

The ratio of the weight of the first alkali metal hydroxide in the first alkali metal hydroxide solution to the total weight of the first alkali metal hydroxide and the second alkali metal hydroxide in the second alkali metal hydroxide solution is 50 to 86%, preferably 65 to 80%, more preferably 65 to 75%. When the ratio of the weight of the first alkali metal hydroxide to the total weight of the first and second alkali metal hydroxides is less than 50%, the gelation temperature is reduced and viscosity is not expressed so that an alkyl cellulose having a high gel strength cannot be produced. When the ratio of the weight of the first alkali metal hydroxide to the total weight of the first and second alkali metal hydroxides is more than 86%, an alkyl cellulose having a high gel strength cannot be produced.

The temperature in the reactor when the cellulose pulp is blended with the first alkali metal hydroxide, preferably, the temperature in the reactor when the first alkali metal hydroxide solution is added to the cellulose pulp, is preferably 10 to 80° C., more preferably 30 to 70° C. in order to obtain a uniform alkali cellulose.

The blending rate of the first alkali metal hydroxide in the first alkali metal hydroxide solution means a molar amount of the first alkali metal hydroxide added per unit time and per mol of the cellulose pulp, and is preferably 1.5 to 48 [mol/mol·hr], more preferably 4.8 to 18.6 [mol/mol·hr], still more preferably 8 to 15 [mol/mol·hr] from the viewpoint of uniform mixing of the first alkali metal hydroxide solution in the system.

After the addition of the first alkali metal hydroxide solution, the mixing with stirring can be continued for further 5 to 30 minutes to make the alkali cellulose more uniform.

In order to suppress local generation of heat in the reactor, an organic solvent not affecting the alkylation, such as dimethyl ether, can be added to the system before, during or after the addition of the first alkali metal hydroxide solution.

Next, the obtained alkali cellulose is reacted with an alkylating agent to obtain a first reaction mixture.

Examples of the alkylating agent include a methylating agent such as methyl chloride, dimethyl sulfate and methyl iodide; and an ethylating agent such as ethyl chloride, diethyl sulfate and ethyl iodide. Methyl chloride is preferred from the viewpoint of the solubility of the obtained alkyl cellulose in water and cost efficiency.

The temperature in the reactor at which the alkylating agent is reacted is preferably 40 to 90° C., more preferably 50 to 80° C. from the viewpoint of reaction control.

The molar amount of the alkylating agent is preferably 0.8 to 1.5, more preferably 1.0 to 1.3 in terms of molar ratio (alkylating agent/total of alkali metal hydroxides) of the molar amount of the alkylation agent to the total molar amount of the first and second alkali metal hydroxides. When the molar ratio (alkylating agent/total of alkali metal hydroxides) is less than 0.8, a required number of alkyl groups may not be introduced. The blending of the alkylating agent at a molar ratio of more than 1.5 may lead to an economic disadvantage.

In the blending of the alkylating agent, the alkylating agent is preferably added to the alkali cellulose. The time for adding the alkylating agent is preferably 30 to 120 minutes, more preferably 40 to 90 minutes from the viewpoint of reaction control and productivity.

The obtained first reaction mixture can be optionally purified in the same method as the conventional purification method of a crude alkyl cellulose, to obtain an alkyl cellulose.

The alkyl cellulose in the first reaction mixture preferably has a degree of substitution (DS) of alkyl group of 0.75 to 1.68, more preferably 0.81 to 1.68, still more preferably 0.99 to 1.37 from the viewpoint of a desired viscosity or storage elastic modulus. The degree of substitution (DS) means an average number of hydroxy groups replaced by alkyl groups per glucose ring unit of cellulose.

Subsequently, a second alkali metal hydroxide solution is blended with the alkylated first reaction mixture without further blending of the alkylating agent, and subjected to mixing with stirring to obtain a second reaction mixture.

The timing of blending the second alkali metal hydroxide solution with the first reaction mixture, in other words, the timing of starting the blending of the second alkali metal hydroxide solution, is preferably after 80% by weight or more of the total amount of the alkylating agent to be blended has been added, more preferably after the completion of addition of the alkylating agent. When the timing of starting the addition of the second alkali metal hydroxide solution is before 80% by weight or more of the total amount of the alkylating agent to be blended has been added, an alkyl cellulose having a high gel strength may not be produced.

The amount of the second alkali metal hydroxide in the second alkali metal hydroxide solution is preferably 0.65 to 2.0, more preferably 0.88 to 1.48 in terms of a molar ratio (second alkali metal hydroxide/cellulose) of the second alkali metal hydroxide to the cellulose in the cellulose pulp. When the molar ratio (alkali metal hydroxide/cellulose) is less than 0.65, an alkyl cellulose having a high gel strength may not be produced. When the molar ratio is more than 2.0, the gelation temperature may be excessively reduced and viscosity may not be expressed, so that an alkyl cellulose having a high gel strength may not be produced.

The temperature in the reactor at the start of blending when the second alkali metal hydroxide solution is blended with the first reaction mixture, preferably, the temperature in the reactor at the start of addition of the second alkali metal hydroxide solution to the first reaction mixture, is preferably 65 to 90° C., more preferably 75 to 85° C. When the temperature in the reactor at the start of addition of the second alkali metal hydroxide solution is less than 65° C., an alkyl cellulose having a high gel strength may not be produced. When the temperature in the reactor at the start of the addition is more than 90° C., heat generation by mercerization with the alkali metal hydroxide or exothermic reaction through alkylation may not be controlled. In order to produce an alkyl cellulose having a high gel strength, the temperature in the reactor when the blending of the second alkali metal hydroxide solution is completed is preferably 80° C. to 100° C., more preferably 85 to 95° C. The temperature at the start of the addition may be selected to be lower than the temperature at the completion of the addition and the temperature difference therebetween may be preferably 3 to 20° C., more preferably 4 to 15° C.

The blending rate of the second alkali metal hydroxide in the second alkali metal hydroxide solution means a molar amount of the second alkali metal hydroxide blended with the first reaction mixture per unit time and per mol of the cellulose in the cellulose pulp, and is preferably 0.5 to 9.6 [mol/mol·hr], more preferably 1.0 to 6.5 [mol/mol·hr], still more preferably 1.0 to 3.5 [mol/mol·hr]. When the blending rate of the second alkali metal hydroxide is less than 0.5 [mol/mol·hr], the period of time for blending the second alkali metal hydroxide becomes long, and thus the reaction time may be extended. In addition, the gelation temperature can be excessively reduced, and thus viscosity may not be expressed. On the other hand, even when the blending rate of the second alkali metal hydroxide is more than 9.6 [mol/mol·hr], an alkyl cellulose having a high gel strength may not be produced.

In the step of blending the second alkali metal hydroxide solution with the first reaction mixture, the second alkali metal hydroxide solution is preferably blended while the temperature in the reactor is increased at a constant rate from the start of the blending of the second alkali metal hydroxide solution until the completion of the blending in order to obtain an alkyl cellulose having a high gel strength. The temperature increase rate is preferably 3.0 to 50° C./hr, more preferably 8.0 to 45° C./hr, still more preferably 8.0 to 30° C./hr.

Generally, the alkali cellulose obtained by mixing a cellulose pulp with an alkali metal hydroxide solution is etherified with an alkylating agent to form an alkyl cellulose. In this case, the alkylating agent in the reaction system is gradually consumed as the etherification progresses. When the temperature in the reactor is constant, the reaction rate of the etherification gradually decreases as the alkylating agent is consumed in the reaction system. Accordingly, by blending the second alkali metal hydroxide solution while increasing the temperature in the reactor at a constant rate, the decrease of the reaction rate of the etherification caused by the consumption of the alkylating agent in the reaction system is suppressed, and the reaction rate of the etherification associated with the blending of the second alkali metal hydroxide solution is relatively increased. Consequently, an alkyl cellulose having a high viscosity and also having a high gel strength can be obtained.

After the blending of the second alkali metal hydroxide solution, the mixing with stirring is preferably continued in order to complete the etherification.

The temperature in the reactor during the mixing with stirring after the blending of the second alkali metal hydroxide solution is preferably 80 to 120° C., more preferably 85 to 100° C. from the viewpoint of reaction controllability. In order to complete the reaction, it is preferable to have heat treatment after completion of the blending of the second alkali metal hydroxide solution.

The time of the mixing with stirring after the blending of the second alkali metal hydroxide solution is preferably 10 to 60 minutes, more preferably 20 to 40 minutes from the viewpoint of productivity.

The obtained second reaction mixture can be purified in the same method as the conventional purification method for a crude alkyl cellulose, to obtain an alkyl cellulose. The purification is carried out, for example, in the method comprising the steps of: mixing the second reaction mixture with water of 60 to 100° C. in a stirring container to dissolve a salt generated as a by-product during the reaction therein; discharging the resulting suspension from the stirring container; and subjecting the discharged suspension to a separation operation to remove the salt to from a desired purified cellulose ether. The separation operation can include use of a rotary pressure filter. After the separation operation, the product is dried with a dryer. The dryer can include a conductive heat transfer-type stirring dryer.

The obtained alkyl cellulose can be optionally pulverized with a conventional pulverizer such as a ball mill, a roller mill and an impact pulverizer, and subsequently can be classified with a sieve to control the particle size.

The alkyl cellulose obtained in this manner preferably includes methyl cellulose and ethyl cellulose.

The alkyl cellulose preferably has a degree of substitution (DS) of alkyl group of 1.61 to 2.03, more preferably 1.74 to 2.03. When the degree of substitution (DS) of alkyl group is less than 1.61, the alkyl cellulose may not have a high gel strength. When the alkyl cellulose has a degree of substitution (DS) of alkyl group of more than 2.03, the amounts of the alkylating agent and the alkali metal hydroxide become large, which may be economically disadvantageous.

Generally, DS represents the degree of substitution and means an average number of hydroxy groups replaced by methoxy groups or ethoxy groups per glucose ring unit of cellulose.

The degree of substitution of alkyl group of the alkyl cellulose can be determined by the Zeisel-GC method described in J. G. Gobler, E. P. Samscl and G. H. Beaber, Talanta, 9, 474 (1962).

The viscosity at 20° C. of the alkyl cellulose in a 1% by weight aqueous solution as measured by a Brookfield viscometer is preferably 1,500 to 11,000 mPa·s (the viscosity in a 2% by weight aqueous solution thereof as measured by a Brookfield viscometer of 20,000 to 150,000 mPa·s), more preferably 2,550 to 9,450 mPa·s (the viscosity in a 2% by weight aqueous solution thereof as measured by a Brookfield viscometer of 35,000 to 130,000 mPa·s), still more preferably 4,300 to 9,450 mPa·s (the viscosity in a 2% by weight aqueous solution as measured by a Brookfield viscometer of 59,200 to 130,000 mPa·s), particularly preferably 5,550 to 9,450 mPa·s (the viscosity in a 2% by weight aqueous solution as measured by a Brookfield viscometer of 76,500 to 130,000 mPa·s). When the viscosity of a 1% by weight aqueous solution is less than 1,500 mPa·s, a food containing such an alkyl cellulose may have a low viscosity. When the viscosity is more than 11,000 mPa·s, such an alkyl cellulose may have an excessively high viscosity, and thus a food containing the alkyl cellulose may have poor texture.

The viscosity by a Brookfield viscometer can be measured in accordance with the analytical method for methyl cellulose described in the Japanese Pharmacopoeia 16th Edition.

The gel strength of the alkyl cellulose is represented by the storage elastic modulus G'(65° C.) at 65° C. in a 1.5% by weight aqueous solution thereof. Generally, the storage elastic modulus represents an elastic component in a solution, in other word, a component having such characteristics that deformation caused by a force applied to a substance is returned to the original shape after removal of the force. The storage elastic modulus is an index of gel strength.

The storage elastic modulus G'(65° C.) at 65° C. of a 1.5% by weight aqueous alkyl cellulose solution is preferably 2,000 to 4,500 Pa, more preferably 2,500 to 4,000 Pa, still more preferably 2,800 to 4,000 Pa, particularly more preferably 3,000 to 4,000 Pa. When the storage elastic modulus G'(65° C.) is less than 2,000 Pa, a food containing such an alkyl cellulose may have a low gel strength and may not have good texture. When the storage elastic modulus G'(65° C.) is more than 4,500 Pa, a food containing such an alkyl cellulose may have an excessively high gel strength and may have hard texture.

The storage elastic modulus G'(65° C.) of a 1.5% by weight aqueous alkyl cellulose solution can be measured with, for example, a rheometer MCR 500 produced by Anton Paar.

The 1.5% by weight aqueous alkyl cellulose solution is prepared as follows: the alkyl cellulose is placed in a wide-mouthed bottle (a container having a diameter of 65 mm, a height of 120 mm and a volume of 350 ml) in an exact amount corresponding to 4.50 g of the dry alkyl cellulose and; hot water of 98° C. is added to the bottle to obtain a total amount of 300.0 g; the bottle is capped; then the content is stirred with an agitator at 350 to 450 rpm for 20 minutes until a uniform dispersion is obtained; and the uniform dispersion is changed into a sample solution through dissolution of the alkyl cellulose in a water bath of 5° C. or lower with 40 minutes of stirring.

The temperature of a sample measuring portion of a rheometer is adjusted at 65° C. beforehand. The above-prepared 1.5% by weight aqueous alkyl cellulose solution is poured into a CC27 measurement cup (a cylindrical aluminum container having a diameter of 30 mm and a height of 80 mm) up to a marked line (25 ml). The angular frequency is set to 1 rad/s, and a distortion with a vibration amplitude of 10% is applied to the aqueous alkyl cellulose solution by using a bob cylinder (with a diameter of 26.7 mm and a height of 40.0 mm: CC27) for starting the measurement. The temperature of the measuring portion is constantly maintained at 65° C. The data are collected at a point every minute. According to the invention, the maximum value of storage elastic modulus measured in the period of from the start to 60 minutes after the start is regarded as the storage elastic modulus G'(65° C.).

The gelation temperature of the alkyl cellulose is evaluated by using the relation between the storage elastic modulus G'(30→80° C.) and a loss elastic modulus G". Generally, the loss elastic modulus represents a viscous component in a solution, or a component having such characteristics that a fluid is deformed to generate resistance by fluid movement. The loss elastic modulus is an index of gelation temperature.

The gelation temperature of a 1.5% by weight aqueous alkyl cellulose solution is preferably 40 to 55° C., more preferably 44 to 53° C., still more preferably 48 to 53° C. When an alkyl cellulose has the gelation temperature of less than 40° C., the alkyl cellulose has an excessively low dissolution temperature in water so that the alkyl cellulose may not be dissolved and fail to express sufficient viscosity. When an alkyl cellulose has the gelation temperature of more than 55° C., a food containing the alkyl cellulose may have a low gel strength and may not have good texture.

The gelation temperature of a 1.5% by weight aqueous alkyl cellulose solution can be determined with, for example, a rheometer MCR 500 produced by Anton Paar.

The 1.5% by weight aqueous alkyl cellulose solution is prepared in the same manner as the sample solution for the storage elastic modulus G'(65° C.).

The temperature of a sample measuring portion of a rheometer is adjusted at 30° C. beforehand. The above-prepared 1.5% by weight aqueous alkyl cellulose solution is poured into a CC27 measurement cup (a cylindrical container having a diameter of 30 mm and a height of 80 mm) up to a marked line (25 ml). The frequency is set to 1 Hz, and a distortion with a vibration amplitude of 0.5% is applied to the aqueous alkyl cellulose solution for starting the measurement. The temperature of the sample measuring portion is increased by 2° C. per minute to 80° C. The data are collected at two points every minute.

The values of the storage elastic modulus G'(30→80° C.) and the loss elastic modulus G" obtained by the measurement are variable as the temperature in the measurement system increases. The temperature at which the values of the loss elastic modulus G" and the storage elastic modulus G'(30→80° C.) become same, in other words, the temperature when G"/G'(30→80° C.) becomes 1, is regarded as the gelation temperature.

EXAMPLES

The present invention will next be described in detail with reference to Examples and Comparative Examples. However, it should not be construed that the present invention is limited to or by Examples.

Example 1

A wood pulp having an intrinsic viscosity of 1,400 ml/g was pulverized with a pulverizer to obtain cellulose pulp powder. The cellulose pulp powder in an amount corresponding to 6.0 kg of cellulose was placed in an internal-stirring pressure-resistant reactor with a jacket. Nitrogen purge were carried out by using a vacuum to thoroughly remove the oxygen in the reactor.

Next, the content in the reactor was stirred while keeping the temperature in the reactor at 60° C. through the temperature control. A 49% by weight aqueous sodium hydroxide solution as the first alkali metal hydroxide solution was added thereto at an addition rate of 10.48 [mol/mol·hr] in such a manner of making a molar ratio (first sodium hydroxide/cellulose) of the first sodium hydroxide to the cellulose to be 2.62, to obtain alkali cellulose.

Subsequently, 2.4 kg of dimethyl ether was added thereto, and the temperature in the reactor was kept at 60° C. through the temperature control. After the addition of dimethyl ether, methyl chloride was added thereto over 60 minutes while increasing the temperature in the reactor from 60° C. to 80° C. in such a manner of making a molar ratio (methyl chloride/total of sodium hydroxides) of the amount of methyl chloride to the total amount of the first and second sodium hydroxides to be 1.1, to obtain a first reaction mixture. Subsequent to the addition of methyl chloride, a 49% by weight aqueous sodium hydroxide solution as the second alkali metal hydroxide solution was added thereto at an addition rate of 3.20 [mol/mol·hr] in such a manner of a molar ratio (second sodium hydroxide/cellulose) of the second sodium hydroxide to the cellulose to be 1.60, to obtain a second reaction mixture. The temperature in the reactor was 77° C. at the start of addition of the second aqueous sodium hydroxide solution and 89° C. at the completion of addition, and the temperature in the reactor was increased at 24° C./hr from the start of addition of the second aqueous sodium hydroxide solution until the completion thereof. After the completion of addition of the second aqueous sodium hydroxide solution, the stirring was continued for 30 minutes to complete the etherification. The ratio of the weight of the first sodium hydroxide to the total weight of the first and second sodium hydroxides in the first and second aqueous sodium hydroxide solutions was 62.1%.

The obtained second reaction mixture was made into a slurry in addition of hot water of 95° C., then washed with a rotary pressure filter, and dried with an air dryer. The dried product was pulverized with a ball mill and classified through a sieve to obtain methyl cellulose. The experimental conditions are shown in Table 1.

The obtained methyl cellulose had a DS of 1.81, and the viscosity at 20° C. of a 1% by weight aqueous solution thereof as measured by a Brookfield viscometer was 5,900 mPa·s (the viscosity at 20° C. of a 2% by weight aqueous solution thereof as measured by a Brookfield viscometer of 80,000 mPa·s). The storage elastic modulus G'(65° C.) at 65° C. of a 1.5% by weight aqueous methyl cellulose solution was determined to be 3,230 Pa, and the gelation temperature was 49° C. The obtained results are shown in Table 1.

Example 2

A cellulose pulp was placed in a reactor in the same manner as in Example 1. The content in the reactor was stirred while keeping the temperature in the reactor at 55° C. through the temperature control. A 49% by weight aqueous sodium hydroxide solution as the first alkali metal hydroxide solution was added thereto at an addition rate of 12.04 [mol/mol·hr] in such a manner of making a weight ratio (first sodium hydroxide/cellulose) of the first sodium hydroxide to the cellulose to be 3.01, to obtain alkali cellulose.

Subsequently, the first reaction mixture was obtained in the same manner as in Example 1. The second reaction mixture was then obtained in the same manner as in Example 1 except that the temperature in the reactor was 81° C. at the start of addition of the second aqueous sodium hydroxide solution and 89° C. at the completion of addition, the temperature in the reactor was increased at 16.4° C./hr from the start of addition of the second aqueous sodium hydroxide solution until the completion thereof, and the second aqueous sodium hydroxide solution was added thereto at an addition rate of 2.58 [mol/mol·hr] in such a manner of making a molar ratio (second sodium hydroxide/cellulose) of the second sodium hydroxide to the cellulose to be 1.26. The ratio of the weight of the first sodium hydroxide to the total weight of the first and second sodium hydroxides in the first and second aqueous sodium hydroxide solutions was 70.5%.

The obtained second reaction mixture was then purified and pulverized in the same manner as in Example 1 to obtain methyl cellulose. The experimental conditions are shown in Table 1.

The obtained methyl cellulose had a DS of 1.85, and the viscosity at 20° C. of a 1% by weight aqueous solution thereof as measured by a Brookfield viscometer was 6,000 mPa·s (the viscosity at 20° C. of a 2% by weight aqueous solution thereof as measured by a Brookfield viscometer of 82,000 mPa·s). The storage elastic modulus G'(65° C.) at 65° C. of a 1.5% by weight aqueous methyl cellulose solution was determined to be 3,300 Pa, and the gelation temperature was 53° C. The obtained results are shown in Table 1.

Example 3

A cellulose pulp was placed in a reactor in the same manner as in Example 1. The content in the reactor was stirred while keeping the temperature in the reactor at 55° C.

through the temperature control. A 49% by weight aqueous sodium hydroxide solution as the first alkali metal hydroxide solution was added thereto at an addition rate of 9.04 [mol/mol·hr] in such a manner of making a molar ratio (first sodium hydroxide/cellulose) of the first sodium hydroxide to the cellulose to be 2.26, to obtain alkali cellulose.

Subsequently, the first reaction mixture was obtained in the same manner as in Example 1. The second reaction mixture was then obtained in the same manner as in Example 1 except that the temperature in the reactor was 80° C. at the start of addition of the second sodium hydroxide solution and 92° C. at the completion of addition, the temperature in the reactor was increased at 36° C./hr from the start of addition of the second aqueous sodium hydroxide solution until the completion thereof, and the second aqueous sodium hydroxide solution was added thereto at an addition rate of 5.52 [mol/mol·hr] in such a manner of making a molar ratio (second sodium hydroxide/cellulose) of the second sodium hydroxide to the cellulose to be 1.84. The ratio of the weight of the first sodium hydroxide to the total weight of the first and second sodium hydroxides in the first and second aqueous sodium hydroxide solutions was 55.1%.

The obtained second reaction mixture was then purified and pulverized in the same manner as in Example 1 to obtain methyl cellulose. The experimental conditions are shown in Table 1.

The obtained methyl cellulose had a DS of 1.85, and the viscosity at 20° C. of a 1% by weight aqueous solution thereof as measured by a Brookfield viscometer was 5,820 mPa·s (the viscosity at 20° C. of a 2% by weight aqueous solution thereof as measured by a Brookfield viscometer of 79,000 mPa·s). The storage elastic modulus G'(65° C.) at 65° C. of a 1.5% by weight aqueous methyl cellulose solution was determined to be 2,750 Pa, and the gelation temperature was 43° C. The obtained results are shown in Table 1.

Example 4

A cellulose pulp was placed in a reactor in the same manner as in Example 1. The content in the reactor was stirred while keeping the temperature in the reactor at 60° C. though the temperature control. A 49% by weight aqueous sodium hydroxide solution as the first alkali metal hydroxide solution was added thereto at an addition rate of 12.04 [mol/mol·hr] in such a manner of making a molar ratio (first sodium hydroxide/cellulose) of the first sodium hydroxide to the cellulose to be 3.01, to obtain alkali cellulose.

Subsequently, the first reaction mixture was obtained in the same manner as in Example 1. The second reaction mixture was then obtained in the same manner as in Example 1 except that the temperature in the reactor was 80° C. at the start of addition of the second sodium hydroxide solution and 90° C. at the completion of addition, the temperature in the reactor was increased at 8.57° C./hr from the start of addition of the second aqueous sodium hydroxide solution until the completion thereof, and the second aqueous sodium hydroxide solution was added at an addition rate of 1.08 [mol/mol·hr] in such a manner of making a molar ratio (second sodium hydroxide/cellulose) of the second sodium hydroxide to the cellulose to be 1.26. The ratio of the weight of the first sodium hydroxide to the total weight of the first and second sodium hydroxides in the first and second aqueous sodium hydroxide solutions was 70.5%.

The obtained second reaction mixture was then purified and pulverized in the same manner as in Example 1 to obtain methyl cellulose. The experimental conditions are shown in Table 1.

The obtained methyl cellulose had a DS of 1.85, and the viscosity at 20° C. of a 1% by weight aqueous solution thereof as measured by a Brookfield viscometer was 5,900 mPa·s (the viscosity at 20° C. of a 2% by weight aqueous solution thereof as measured by a Brookfield viscometer of 80,000 mPa·s). The storage elastic modulus G'(65° C.) at 65° C. of a 1.5% by weight aqueous methyl cellulose solution was determined to be 3,100 Pa, and the gelation temperature was 51° C. The obtained results are shown in Table 1.

Example 5

After the addition of dimethyl ether to the alkali cellulose, methyl chloride was added over 60 minutes while increasing the temperature in the reactor from 60° C. to 85° C. through the temperature control in such a manner of making a molar ratio (methyl chloride/total of sodium hydroxides) of the amount of the methyl chloride to the total amount of the first and second sodium hydroxides to be 1.1, to obtain a first reaction mixture. Methyl cellulose was then obtained in the same manner as in Example 1 except that the temperature in the reactor was 85° C. at the start of addition of the second sodium hydroxide solution and 89.5° C. at the completion of addition, and the temperature in the reactor was increased at 9.0° C./hr from the start of addition of the second aqueous sodium hydroxide solution until the completion thereof. The experimental conditions are shown in Table 1.

The obtained methyl cellulose had a DS of 1.83, and the viscosity at 20° C. of a 1% by weight aqueous solution thereof as measured by a Brookfield viscometer was 6,250 mPa·s (the viscosity at 20° C. of a 2% by weight aqueous solution thereof as measured by a Brookfield viscometer of 84,750 mPa·s). The storage elastic modulus G'(65° C.) at 65° C. of a 1.5% by weight aqueous methyl cellulose solution was determined to be 3,700 Pa, and the gelation temperature was 43° C.

Example 6

Methyl cellulose was obtained in the same manner as in Example 1 except that a wood pulp having an intrinsic viscosity of 1,940 ml/g was used, the temperature in the reactor was 82° C. at the start of addition of the second sodium hydroxide solution and 90° C. at the completion of addition, and the temperature in the reactor was increased at 16° C./hr from the start of addition of the second aqueous sodium hydroxide solution until the completion thereof. The experimental conditions are shown in Table 1.

The obtained methyl cellulose had a DS of 1.84, and the viscosity at 20° C. of a 1% by weight aqueous solution thereof as measured by a Brookfield viscometer was 9,200 mPa·s (the viscosity at 20° C. of a 2% by weight aqueous solution thereof as measured by a Brookfield viscometer of 125,000 mPa·s). The storage elastic modulus G'(65° C.) at 65° C. of a 1.5% by weight aqueous methyl cellulose solution was determined to be 3,800 Pa, and the gelation temperature was 52° C.

Example 7

A cellulose pulp was placed in a reactor in the same manner as in Example 1. The content in the reactor was stirred while keeping the temperature in the reactor at 55° C.

through the temperature control. A 49% by weight aqueous sodium hydroxide solution as the first alkali metal hydroxide solution was added thereto at an addition rate of 11.39 [mol/mol·hr] in such a manner of making a weight ratio (first sodium hydroxide/cellulose) of the first sodium hydroxide to the cellulose to be 2.85, to obtain alkali cellulose.

Subsequently, the first reaction mixture was obtained in the same manner as in Example 1. The second reaction mixture was then obtained in the same manner as in Example 1 except that the temperature in the reactor was 79° C. at the start of addition of the second sodium hydroxide solution and 91° C. at the completion of addition, the temperature in the reactor was increased at 24° C./hr from the start of addition of the second aqueous sodium hydroxide solution until the completion thereof, and the second aqueous sodium hydroxide solution was added at an addition rate of 2.80 [mol/mol·hr] in such a manner of making a molar ratio (second sodium hydroxide/cellulose) of the second sodium hydroxide to the cellulose to be 1.40. The ratio of the weight of the first sodium hydroxide to the total weight of the first and second sodium hydroxides in the first and second aqueous sodium hydroxide solutions was 67.0%.

The obtained second reaction mixture was then purified and pulverized in the same manner as in Example 1 to obtain methyl cellulose. The experimental conditions are shown in Table 1.

The obtained methyl cellulose had a DS of 1.82, and the viscosity at 20° C. of a 1% by weight aqueous solution thereof as measured by a Brookfield viscometer was 6,050 mPa·s (the viscosity at 20° C. of a 2% by weight aqueous solution thereof as measured by a Brookfield viscometer of 82,500 mPa·s). The storage elastic modulus G'(65° C.) at 65° C. of a 1.5% by weight aqueous methyl cellulose solution was determined to be 3,300 Pa, and the gelation temperature was 51° C. The obtained results are shown in Table 1.

Comparative Example 1

A cellulose pulp was placed in a reactor in the same manner as in Example 1. The content in the reactor was stirred while keeping the temperature in the reactor at 60° C. through the temperature control. All of the 49% by weight aqueous sodium hydroxide solution was added thereto at once without division at an addition rate of 18.88 [mol/mol·hr] in such a manner of making a molar ratio (sodium hydroxide/cellulose) of the sodium hydroxide to the cellulose to be 4.72, to obtain an alkali cellulose.

Subsequently, 2.4 kg of dimethyl ether was added thereto, while keeping the temperature in the reactor at 60° C. through the temperature control. Methyl chloride was added over 60 minutes while increasing the temperature in the reactor from 60 to 80° C. through the temperature control in such a manner of making a molar ratio (methyl chloride/sodium hydroxide) of the methyl chloride to the sodium hydroxide to be 1.1.

Subsequent to the addition of methyl chloride, etherification was carried out for 70 minutes, while increasing the temperature in the reactor from 80° C. to 95° C., to obtain a crude methyl cellulose.

The obtained crude methyl cellulose was then purified and pulverized in the same manner as in Example 1 to obtain methyl cellulose. The experimental conditions are shown in Table 1.

The obtained methyl cellulose had a DS of 1.81, and the viscosity at 20° C. of a 1% by weight aqueous solution thereof as measured by a Brookfield viscometer was 7,300 mPa·s (the viscosity of a 2% by weight aqueous solution thereof as measured by a Brookfield viscometer of 99,100 mPa·s). The storage elastic modulus G'(65° C.) at 65° C. of a 1.5% by weight aqueous methyl cellulose solution was determined to be 1,890 Pa, and the gelation temperature was 63° C.

Comparative Example 2

A cellulose pulp was placed in a reactor in the same manner as in Example 1. The content in the reactor was stirred while keeping the temperature in the reactor at 40° C. through the temperature control. A 49% by weight aqueous sodium hydroxide solution as the first alkali metal hydroxide solution was added thereto at an addition rate of 7.48 [mol/mol·hr] in such a manner of making a molar ratio (first sodium hydroxide/cellulose) of the first sodium hydroxide to the cellulose to be 1.87. After the completion of the addition, the stirring was continued for further 10 minutes.

Subsequently, 2.4 kg of dimethyl ether was added thereto, while keeping the temperature in the reactor at 40° C. through the temperature control. After the addition of dimethyl ether, methyl chloride was divided into two portions and added in two steps in the same manner as the additions of the sodium hydroxide solution. The first methyl chloride was added over 25 minutes in such a manner of making a molar ratio (first methyl chloride/first sodium hydroxides) of the first methyl chloride to the first sodium hydroxide to be 1.1, to obtain a first reaction mixture. After the completion of addition of the first methyl chloride, the temperature in the reactor was increased from 40° C. to 80° C. over 40 minutes. After the temperature reached 80° C., the mixing with stirring was continued for further 30 minutes.

Subsequently, a 49% by weight aqueous sodium hydroxide solution as the second alkali metal hydroxide solution was added thereto at an addition rate of 14.54 [mol/mol·hr] while keeping the temperature in the reactor at 80° C. in such a manner of making a molar ratio (second sodium hydroxide/cellulose) of the second sodium hydroxide to the cellulose to be 2.42, to obtain a second reaction mixture. The temperature in the reactor was 80° C. during the addition of the second aqueous sodium hydroxide solution and 80° C. also at the completion of addition. The ratio of the weight of the first sodium hydroxide to the total weight of the first and second sodium hydroxides in the first and second aqueous sodium hydroxide solutions was 43.6%.

Subsequently, the second methyl chloride was added over 30 minutes while keeping the temperature in the reactor at 80° C. in such a manner of making a molar ratio (second methyl chloride/second sodium hydroxides) of the second methyl chloride and the second sodium hydroxide to be 1.1. After the addition of the second methyl chloride, the mixing with stirring was continued for further 30 minutes while keeping the temperature in the reactor at 80° C. The temperature in the reactor was then increased from 80° C. to 95° C. over 15 minutes to obtain crude methyl cellulose.

The obtained crude methyl cellulose was purified and pulverized in the same manner as in Example 1 to obtain methyl cellulose. The experimental conditions are shown in Table 1.

The obtained methyl cellulose had a DS of 1.85, and the viscosity at 20° C. of a 1% by weight aqueous solution thereof as measured by a Brookfield viscometer was 6,250 mPa·s (the viscosity at 20° C. of a 2% by weight aqueous solution thereof as measured by a Brookfield viscometer of 85,000 mPa·s). The storage elastic modulus G'(65° C.) at 65°

C. of a 1.5% by weight aqueous methyl cellulose solution was determined to be 4,800 Pa, and the gelation temperature was 43° C.

Comparative Example 3

Methyl cellulose was obtained in the same manner as in Comparative Example 2 except that a wood pulp having an intrinsic viscosity of 960 ml/g was used. The experimental conditions are shown in Table 1.

The obtained methyl cellulose had a DS of 1.85, and the viscosity at 20° C. of a 1% by weight aqueous solution thereof as measured by a Brookfield viscometer was 780 mPa·s (the viscosity at 20° C. of a 2% by weight aqueous solution thereof as measured by a Brookfield viscometer of 10,600 mPa·s). The storage elastic modulus G'(65° C.) at 65° C. of a 1.5% by weight aqueous methyl cellulose solution was determined to be 3,100 Pa, and the gelation temperature was 46° C. The obtained results are shown in Table 1.

Comparative Example 4

A cellulose pulp was placed in a reactor in the same manner as in Example 1. The content in the reactor was stirred while keeping the temperature in the reactor at 60° C. through the temperature control. A 49% by weight aqueous sodium hydroxide solution as the first alkali metal hydroxide solution was added thereto at an addition rate of 6.28 [mol/mol·hr] in such a manner of making a molar ratio (first sodium hydroxide/cellulose) of the first sodium hydroxide to the cellulose to be 1.57, to obtain alkali cellulose.

Subsequently, the first reaction mixture was obtained in the same manner as in Example 1. The second reaction mixture was then obtained in the same manner as in Example 1 except that the temperature in the reactor was 78° C. at the start of addition of the second sodium hydroxide solution and 90° C. at the completion of addition, the temperature in the reactor was increased at 14.4° C./hr from the start of addition of the second aqueous sodium hydroxide solution until the completion thereof, and the second aqueous sodium hydroxide solution was added at an addition rate of 2.82 [mol/mol·hr] in such a manner of making a molar ratio (second sodium hydroxide/cellulose) of the second sodium hydroxide to the cellulose to be 2.35. The ratio of the weight of the first sodium hydroxide to the total weight of the first and second sodium hydroxides in the first and second aqueous sodium hydroxide solutions was 40.1%.

The obtained second reaction mixture was then purified and pulverized in the same manner as in Example 1 to obtain methyl cellulose. The experimental conditions are shown in Table 1.

The obtained methyl cellulose had a DS of 1.83, and the viscosity at 20° C. of a 1% by weight aqueous solution thereof as measured by a Brookfield viscometer was 1,460 mPa·s (the viscosity at 20° C. of a 2% by weight aqueous solution thereof as measured by a Brookfield viscometer of 19,800 mPa·s). The storage elastic modulus G'(65° C.) at 65° C. of a 1.5% by weight aqueous methyl cellulose solution was determined to be 1,465 Pa, and the gelation temperature was 38° C. The obtained results are shown in Table 1.

Comparative Example 5

A cellulose pulp was placed in a reactor in the same manner as in Example 1. The content in the reactor was stirred while keeping the temperature in the reactor at 60° C. through the temperature control. A 49% by weight aqueous sodium hydroxide solution as the first alkali metal hydroxide solution was added thereto at an addition rate of 16.44 [mol/mol·hr] in such a manner of making a molar ratio (first sodium hydroxide/cellulose) of the first sodium hydroxide to the cellulose to be 4.11, to obtain alkali cellulose.

Subsequently, the first reaction mixture was obtained in the same manner as in Example 1. The second reaction mixture was then obtained in the same manner as in Example 1 except that the temperature in the reactor was 80° C. at the start of addition of the second sodium hydroxide solution and 91° C. at the completion of addition, the temperature in the reactor was increased at 22° C./hr from the start of addition of the second aqueous sodium hydroxide solution until the completion thereof, and the second aqueous sodium hydroxide solution was added at an addition rate of 0.92 [mol/mol·hr] in such a manner of making a molar ratio (second sodium hydroxide/cellulose) of the second sodium hydroxide and the cellulose to be 0.46. The ratio of the weight of the first sodium hydroxide to the total weight of the first and second sodium hydroxides in the first and second aqueous sodium hydroxide solutions was 89.9%.

The obtained second reaction mixture was then purified and pulverized in the same manner as in Example 1 to obtain methyl cellulose. The experimental conditions are shown in Table 1.

The obtained methyl cellulose had a DS of 1.82, and the viscosity at 20° C. of a 1% by weight aqueous solution thereof as measured by a Brookfield viscometer was 5,750 mPa·s (the viscosity at 20° C. of a 2% by weight aqueous solution thereof as measured by a Brookfield viscometer of 78,000 mPa·s). The storage elastic modulus G'(65° C.) at 65° C. of a 1.5% by weight aqueous methyl cellulose solution was determined to be 1,950 Pa, and the gelation temperature was 62° C. The obtained results are shown in Table 1.

TABLE 1

| | | Production conditions | | | | | | |
|---|---|---|---|---|---|---|---|---|
| | | First NaOH | | | | Second NaOH | | |
| | | Weight ratio to total amount of first and second NaOH | Molar ratio to cellulose | Addition rate to cellulose (mol/mol · hr) | | Molar ratio to cellulose | Addition rate to cellulose (mol/mol · hr) | Temp. in reactor at start of addition (° C.) | Temp. increase rate (° C./hr) |
| | Addition of methyl chloride | | | | | | | | |
| Example 1 | One step | 62.1 | 2.62 | 10.48 | 1.6 | 3.20 | 77 | 24 |
| Example 2 | One step | 70.5 | 3.01 | 12.04 | 1.26 | 2.58 | 81 | 16.4 |
| Example 3 | One step | 55.1 | 2.26 | 9.04 | 1.84 | 5.52 | 80 | 36 |

TABLE 1-continued

| | | | | | | | | |
|---|---|---|---|---|---|---|---|---|
| Example 4 | One step | 70.5 | 3.01 | 12.04 | 1.26 | 1.08 | 80 | 8.57 |
| Example 5 | One step | 62.1 | 2.62 | 10.48 | 1.6 | 3.20 | 85 | 9 |
| Example 6 | One step | 62.1 | 2.62 | 10.48 | 1.6 | 3.20 | 82 | 16 |
| Example 7 | One step | 67.0 | 2.85 | 11.39 | 1.4 | 2.80 | 79 | 24 |
| Comp. Ex. 1 | One step | 100.0 | 4.72 | 18.88 | — | — | — | — |
| Comp. Ex. 2 | Two steps | 43.6 | 1.87 | 7.48 | 2.42 | 14.54 | 80 | — |
| Comp. Ex. 3 | Two steps | 43.6 | 1.87 | 7.48 | 2.42 | 14.54 | 80 | — |
| Comp. Ex. 4 | One step | 40.1 | 1.57 | 6.28 | 2.35 | 2.82 | 78 | 14.4 |
| Comp. Ex. 5 | One step | 89.9 | 4.11 | 16.44 | 0.46 | 0.92 | 80 | 22 |

| | Physical properties | | | |
|---|---|---|---|---|
| | Degree of substitution of methoxy group (DS) | Viscosity of 1% by weight of aqueous solution by Brookfield viscometer (mPa · s) | Storage elastic modulus G'(65° C.) of 1.5 wt % of aqueous solution (Pa) | Gelation temperature of 1.5 wt % of aqueous solution (° C.) |
| Example 1 | 1.81 | 5,900 | 3,230 | 49 |
| Example 2 | 1.85 | 6,000 | 3,300 | 53 |
| Example 3 | 1.85 | 5,820 | 2,750 | 43 |
| Example 4 | 1.85 | 5,900 | 3,100 | 51 |
| Example 5 | 1.83 | 6,250 | 3,700 | 43 |
| Example 6 | 1.84 | 9,200 | 3,800 | 52 |
| Example 7 | 1.82 | 6,050 | 3.300 | 51 |
| Comp. Ex. 1 | 1.81 | 7,300 | 1,890 | 63 |
| Comp. Ex. 2 | 1.85 | 6,250 | 4,800 | 43 |
| Comp. Ex. 3 | 1.85 | 780 | 3,100 | 46 |
| Comp. Ex. 4 | 1.83 | 1,460 | 1,465 | 38 |
| Comp. Ex. 5 | 1.82 | 5,750 | 1,950 | 62 |

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A method for producing an alkyl cellulose, comprising the steps of:
    mixing a cellulose pulp with a first alkali metal hydroxide solution with stirring to obtain an alkali cellulose;
    reacting the alkali cellulose with an alkylating agent to obtain a first reaction mixture including a first alkyl cellulose that is substituted with an alkyl group;
    blending a second alkali metal hydroxide solution with the first reaction mixture with stirring to obtain a second reaction mixture including a second alkyl cellulose, wherein the blending of the second alkali metal hydroxide solution with the first reaction mixture is performed without adding additional alkylating agent; and
    purifying the second reaction mixture to obtain the second alkyl cellulose,
    wherein a ratio of a weight of a first alkali metal hydroxide in the first alkali metal hydroxide solution to a total weight of the first alkali metal hydroxide and a second alkali metal hydroxide in the second alkali metal hydroxide solution is 50 to 86%.

2. The method for producing an alkyl cellulose according to claim 1, wherein a molar ratio (second alkali metal hydroxide/cellulose) of the second alkali metal hydroxide in the second alkali metal hydroxide solution to cellulose in the cellulose pulp is 0.65 to 2.0.

3. The method for producing an alkyl cellulose according to claim 2, wherein a blending rate of the second alkali metal hydroxide is 0.5 to 9.6 [mol/mol·hr] where the blending rate is a molar amount of the second alkali metal hydroxide blended with the first reaction mixture per unit time and per mol of cellulose in the cellulose pulp.

4. The method for producing an alkyl cellulose according to claim 1, wherein a blending rate of the second alkali metal hydroxide is 0.5 to 9.6 [mol/mol·hr] where the blending rate is a molar amount of the second alkali metal hydroxide blended with the first reaction mixture per unit time and per mol of cellulose in the cellulose pulp.

5. The method for producing an alkyl cellulose according to claim 1, wherein, in the step of blending a second alkali metal hydroxide solution with the first reaction mixture, a temperature in a reactor is 65 to 90° C. at start of the blending.

6. The method for producing an alkyl cellulose according to claim 1, wherein, in the step of blending a second alkali metal hydroxide solution with the first reaction mixture, the second alkali metal hydroxide solution is blended while a temperature in the reactor is increased at a constant rate from start of the blending to completion thereof.

7. The method for producing an alkyl cellulose according to claim 6, wherein the temperature increase rate is 3.0 to 50° C./hr.

8. The method for producing an alkyl cellulose according to claim 1, wherein a molar ratio (first alkali metal hydroxide/cellulose) of the first alkali metal hydroxide in the first alkali metal hydroxide solution to cellulose in the cellulose pulp is 2.0 to 4.0.

9. The method for producing an alkyl cellulose according to claim 1, wherein the first alkyl cellulose in the first reaction mixture has a degree of substitution (DS) of the alkyl group of 0.75 to 1.68.

10. An alkyl cellulose having a viscosity at 20° C. of a 1% by weight aqueous solution of the alkyl cellulose of 2,550 to 9,450 mPa·s as measured by a Brookfield viscometer, and having a storage elastic modulus G'(65° C.) at 65° C. of a 1.5% by weight aqueous solution thereof of 2,000 to 4,500 Pa.

11. The alkyl cellulose according to claim 10, wherein a 1.5% by weight aqueous solution of the alkyl cellulose has a gelation temperature of 40 to 55° C.

12. The alkyl cellulose according to claim 11, having a degree of substitution (DS) of alkyl group of 1.61 to 2.03.

13. The alkyl cellulose according to claim 10, having a degree of substitution (DS) of alkyl group of 1.61 to 2.03.

* * * * *